United States Patent
Shemer et al.

(10) Patent No.: US 11,921,589 B2
(45) Date of Patent: Mar. 5, 2024

(54) ANY POINT IN TIME BACKUP ON SECONDARY STORAGE FOR DISTRIBUTED CONSISTENCY GROUPS

(71) Applicant: EMC IP Holding Company LLC, Hopkinton, MA (US)

(72) Inventors: Jehuda Shemer, Kfar Saba (IL); Valerie Lotosh, Ramat-Gan (IL); Saar Cohen, Moshav Mishmeret (IL); Erez Sharvit, Ramat Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 196 days.

(21) Appl. No.: 16/909,613

(22) Filed: Jun. 23, 2020

(65) Prior Publication Data

US 2021/0397521 A1    Dec. 23, 2021

(51) Int. Cl.
  *G06F 11/14* (2006.01)
  *G06F 16/178* (2019.01)
  *G06F 16/18* (2019.01)
  *G06F 16/188* (2019.01)

(52) U.S. Cl.
  CPC ...... *G06F 11/1461* (2013.01); *G06F 11/1407* (2013.01); *G06F 11/1451* (2013.01); *G06F 11/1464* (2013.01); *G06F 11/1469* (2013.01); *G06F 16/178* (2019.01); *G06F 16/1815* (2019.01); *G06F 16/188* (2019.01); *G06F 2201/80* (2013.01)

(58) Field of Classification Search
  CPC ............... G06F 2201/80; G06F 16/188; G06F 11/1469; G06F 16/178; G06F 11/1451; G06F 11/1461; G06F 16/1815; G06F 11/1464; G06F 11/1407; G06F 2201/815; G06F 11/1471

USPC .................................................. 711/162, 161
See application file for complete search history.

(56) References Cited

U.S. PATENT DOCUMENTS

| | | | |
|---|---|---|---|
| 8,335,771 B1 | 12/2012 | Natanzon et al. | |
| 8,478,955 B1* | 7/2013 | Natanzon ............ | G06F 11/2074 707/648 |
| 8,694,700 B1 | 4/2014 | Natanzon et al. | |
| 8,954,796 B1 | 2/2015 | Cohen et al. | |
| 9,032,160 B1 | 5/2015 | Natanzon et al. | |
| 9,600,377 B1 | 3/2017 | Cohen et al. | |
| 9,720,618 B1* | 8/2017 | Panidis .................. | G06F 11/14 |

(Continued)

FOREIGN PATENT DOCUMENTS

| | | |
|---|---|---|
| EP | 1959346 A2 | 8/2008 |
| TW | 202147787 A | 12/2021 |
| WO | 2021/231255 A1 | 11/2021 |

OTHER PUBLICATIONS

International Search Report and Written Opinion received for PCT Patent Application No. PCT/US21/16395, dated May 14, 2021, 24 pages.

*Primary Examiner* — David Yi
*Assistant Examiner* — Zubair Ahmed
(74) *Attorney, Agent, or Firm* — Workman Nydegger

(57) ABSTRACT

Any point in time backups for distributed consistency is disclosed. IOs from a consistency group are received by multiple aggregators and stored in corresponding journals. In response to a bookmark, the multiple journals are synthesized to create a do stream or to add the multiple journals to the do stream. A full synchronization operation can be performed simultaneously with replication operations.

18 Claims, 9 Drawing Sheets

(56) References Cited

U.S. PATENT DOCUMENTS

| | | |
|---|---|---|
| 9,740,702 B2 | 8/2017 | Pawar et al. |
| 10,019,172 B2 | 7/2018 | Mitkar et al. |
| 10,061,657 B1 | 8/2018 | Chopra et al. |
| 10,101,943 B1 | 10/2018 | Ayzenberg et al. |
| 10,148,751 B1 * | 12/2018 | Natanzon .............. G06F 11/202 |
| 10,157,014 B1 * | 12/2018 | Panidis .............. G06F 11/1471 |
| 10,235,145 B1 * | 3/2019 | Natanzon ................ G06F 8/451 |
| 10,437,783 B1 | 10/2019 | Cohen et al. |
| 10,496,601 B1 | 12/2019 | Natanzon |
| 2006/0179343 A1 | 8/2006 | Kitamura |
| 2008/0109448 A1 | 5/2008 | Aboel-Nil et al. |
| 2010/0318812 A1 | 12/2010 | Auradkar et al. |
| 2015/0026422 A1 | 1/2015 | Dudgeon et al. |
| 2016/0283329 A1 | 9/2016 | Natanzon |
| 2017/0031783 A1 | 2/2017 | Kedem et al. |
| 2017/0083540 A1 | 3/2017 | Mamluk et al. |
| 2018/0210793 A1 | 7/2018 | Mamluk |
| 2018/0225052 A1 | 8/2018 | Rogers et al. |
| 2019/0065322 A1 | 2/2019 | Chakankar et al. |
| 2019/0340263 A1 | 11/2019 | Porat-Stoler et al. |
| 2020/0409583 A1 | 12/2020 | Kusters et al. |
| 2021/0081432 A1 | 3/2021 | Grunwald et al. |

\* cited by examiner

ANY POINT IN TIME BACKUP ON SECONDARY STORAGE FOR DISTRIBUTED CONSISTENCY GROUPS

FIELD OF THE INVENTION

Embodiments of the present invention generally relate to data protection and data protection operations. More particularly, at least some embodiments of the invention relate to systems, hardware, software, computer-readable media, and methods for data protection operations including any point in time operations.

BACKGROUND

Computing systems often store data that has substantial value. Any entity that has a problem with their data may experience economic issues, customer issues, trust issues, and the like. Consequently, the ability to protect data is an important aspect of many computing systems. The ability to restore data as quickly and with as little loss as possible reduces the scope and magnitude of these problems.

Computing systems often employ virtual machines to run applications. Protecting virtual machines, however, can be difficult. Conventionally, snapshots are used to backup virtual machines. Performing snapshots, however, requires quiescing and stunning the virtual machines. This may disrupt the applications running on the virtual machines.

In addition, it is difficult to take frequent snapshots from a practical perspective. There are many system wide limits that impact the number of snapshots that can be taken. In fact, most systems are limited to taking snapshots in the range of minutes to hours. While mirroring systems can be used to compensate for the snapshot frequency, these solutions require substantial storage resources and are associated with significant management overhead.

All of these factors have an impact on an entity's recovery point objective (RPO). The RPO expresses a relationship between the time between backups and the amount of data that could be lost between backups. If the RPO of an entity is kept low, the entity is happier when data is corrupted or lost compared to a situation with a larger RPO.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for data protection operations including backup operations, restore operations, image generation operations, replication operations, point in time (PiT) operations, deduplication operations, or the like or combination thereof. Embodiments of the invention further relate to data protection operations for distributed consistency groups.

Embodiments of the invention relate to systems and methods for performing backup operations including PiT operations. PiT operations include or relate to any of the operations associated with replicating data and with generating, synthesizing, and/or storing images or snapshots or other backups on a secondary storage (e.g., DELL EMC Data Domain). These operations allow data/applications to be recovered to any PiT supported by the backed up data.

A data protection system may continuously replicate an IO stream of a production system (e.g., writes between a virtual machine and one or more virtual disks or between an application and one or more virtual disks). The replicated IO stream may be formatted as a journal that keeps the data and the metadata in separate streams. The journal is stored on a secondary storage device and backups for any PiT can be generated or synthesized from the journal and/or a full backup. This is achieved without performing snapshots on source data (thus native snapshots are not required). Embodiments of the invention are associated with significantly less overhead compared to native snapshots (which often require stunning and/or quiescing applications) and also allow any point in time backup functionality. Backups can also be stored on second tier storage.

Figure 1:
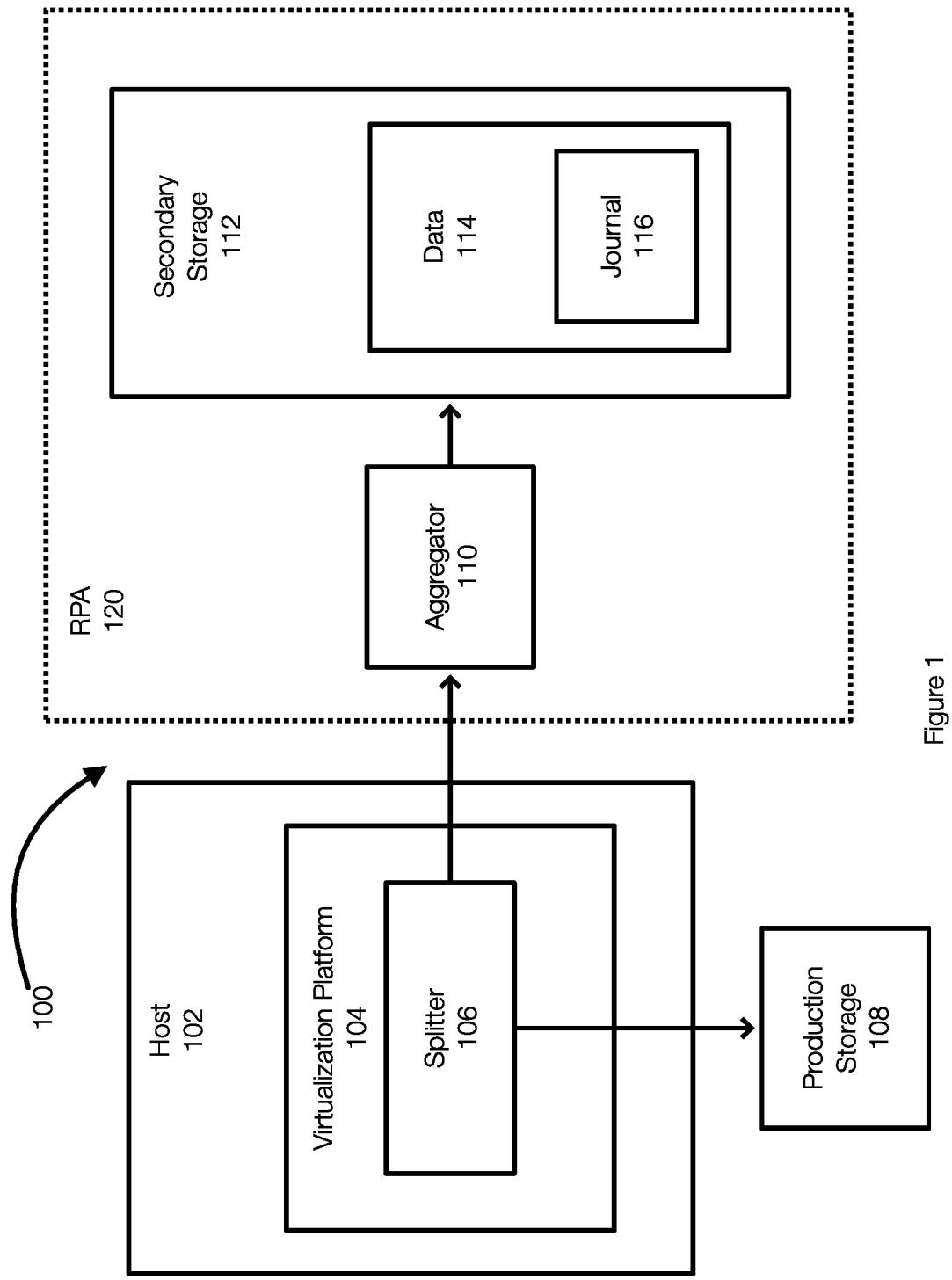
FIG. 1 illustrates an example of a data protection system configured to perform data protection operations and generate point in time backups without the use of native snapshots.

FIG. 1 illustrates an example of a computing environment in which embodiments of the invention may be implemented. FIG. 1 illustrates an example of a data protection system configured to generate PiT backups. The PiT backups can be synthesized from a journal and the PiT backups can be generated without requiring snapshots from a production site or system or application.

FIG. 1 illustrates a host 102. The host 102 may be a host machine, a virtual machine or other configuration. In this example, the host 102 may be a virtual machine operating with or on a virtualization platform 104. The virtualization platform 104 may be associated with multiple virtual machines and may virtualize hardware for those virtual machines. Hypervisors and VMware ESX and ESXi are examples of the virtualization platform 104. The virtualization platform 104 allows applications to be run in virtual machines on the host 102 or other hardware.

In this example, the virtualization platform 104 may be associated with a splitter 106. The splitter 106 may be embedded or operate within the virtualization platform 104 or as a separate layer. The splitter 106 is configured to replicate data and, by way of example only, may replicate data serially or in parallel. In effect, the splitter 106 intercepts IOs such as writes. The writes are forwarded or passed through to the production storage 108. A copy of the writes or the data thereof is sent to the data protection system.

More specifically, the splitter 106 may intercept writes to the production storage 108 and replicate the writes to an RPA (e.g., Recover Point Appliance or, more generally, a replication appliance) 120. The RPA 120 may be physical or virtual. The splitter 106 (which may be a mirror type arrangement) may replicate the data in parallel. When replicating or splitting in parallel, a copy of the data is sent to the RPA 120 in parallel or near-parallel with the data sent to the production storage 108. When splitting in parallel, the splitter 106 may not wait for an acknowledgement with regard to committing the write the production storage 108 before transmitting the data or a copy of the data to the RPA 120.

When transmitting or splitting serially, in one embodiment, the splitter may send the write to the production storage 108. After receiving an acknowledgment, the splitter 106 may then transmit the data or a copy of the data to the RPA 120. As discussed below, the acknowledgement may be sent by an aggregator 110 in some instances.

The RPA 120 may include the aggregator 110 and a secondary storage 112, which is an example of second tier storage in one example. The secondary storage may also include other components such as a processor and/or controller that allows for processing the data for storage and/or for synthesizing backups. Thus, the writes or the IO data stream coming from the splitter 106 may be committed to a journal 116 and stored in the secondary storage 112. The data 114 may include images or backups that are synthesized or generated from the journal 116. DELL DataDomain is an example of the RPA 120. The aggregator 110 may or may not be integrated with or be a part of the RPA 120. However, the aggregator 110 may be part of the RPA 120 and may be included in the data protection system. The splitter 106 may also be part of the data protection system.

In one example, the secondary storage 112 is deduplicated. For instance, the data 114 (which may include the journal 116) may be stored in a pool with signatures (e.g., hashes) calculated for each block or each datum. In other words, the data 114 stored in the secondary storage 112, by way of example only, includes the data blocks or chunks, signatures for each of the blocks, a journal, and backups or images. A volume in the storage may be a sequence of data signatures—similar to a list of pointers to the data. This allows every piece of data can be stored once and pointed to multiple times resulting in deduplication of the data across the secondary storage 112. Typically, the signatures are arranged in a tree structure. The journal may be stored using the signatures and is also deduplicated and does not take as much space as the data itself.

Data copy operations on storage systems such as the secondary storage 112 can be very efficient as the data itself need not be copied. Only the signatures need to be copied. This is an example of a fast copy. Advantageously, whole volumes can be copied in fractions of the time that a full copy would entail.

In systems that are deduplicated, such as the secondary storage 112 or, more generally, the RPA 120, the deduplication may occur at a fixed chunk size (e.g., 4K or 8K chunks or blocks). In addition, the deduplication is aligned to multiples of the chunk size. As a result, IOs or writes should be aligned at these boundaries. For a 4K chunk size, the IOs should be aligned at 0, 4K, 8K, 12K, etc., boundaries or addresses. If an IO is not aligned (e.g., a 4K IO is targeted to the address 2K), the IOs are refused or broken up along the alignment boundaries.

This can potentially cause problems at the target site at least because the target site (the RPA 120 or the secondary storage 112) may not have access to the data needed to complete the coverage of the full chunk. As a result, some IOs may need to be handled in certain manners. Unaligned chunks, IOs that are not a multiple of the chunk size, and IOs that are smaller than the chunk size are processed prior to or during the process of ingesting the chunks into the RPA 120 or into the secondary storage 112. The processing may occur at the splitter 106 for example or at the aggregator 110. These chunks may be processed to be aligned and to be of the proper size.

In one example, the host 102 (or an application or a virtual machine) may be associated with an IO pattern and data in the IO stream transmitted to the aggregator 110 may not conform to the requirements of the RPA 120. Embodiments of the invention are equipped to handle different IO patterns.

Embodiments of the invention provide a schema or system for performing data protection operations including backup or replication operations without the use of native snapshots. Thus, a snapshot of the host 102 or of a virtual machine or application on the host is not required. A streaming IO source, which may be the splitter 106, captures or intercepts the IO stream being sent to the production storage 108. A copy of the IO stream is sent to the RPA 120. The copy may have a different format, however, than the IO stream that is intercepted.

The replicated data stored in this manner enables near zero RPO backups, any point in time backups, and does not require the source side to perform stunning or quiescing operations.

As illustrated in FIG. 1, example components of the data protection system may include a streaming IO source such as the splitter 106, an aggregator 110 and a journal 116. The journal 116 may be processed to create and manage backups stored in the data 114 on the secondary storage 112.

In some examples, IOs sent by virtual machines or hosts are sent to at least two locations. Mirroring devices and splitters, such as the splitter 106, achieve this result in similar ways. In either case, the original IOs arrive on the volume such as the production storage 108 and a second copy is introduced into the data protection system, such as the RPA 120.

There may be some differences when processing unaligned IOs if the IOs are sent in parallel to the two locations, or serially sent to one location and the then the other.

In one example, the RPA 120 is configured to handle incoming data streams, such as incoming backup data streams. These data streams are typically large chunks of data. However, IOs coming from or received by the splitter 106 are dependent on an IO pattern associated with an application on the host or on a virtual machine that is generating the IOs. These IOs may have varying sizes and may not be optimally configured for consumption by the RPA 120. Thus, while IOs can be split and transmitted directly to the secondary storage 112, embodiments of the invention include an aggregator 110 that is configured to provide a buffer. More specifically, the aggregator 110 may aggregate or batch the IOs prior to sending to the secondary storage 112. Thus, the RPA 120 provides aggregation functionality. The aggregator 110 may also be configured to read the production storage 108 or instruct the splitter to read the production storage 108 when necessary. For example, in order for the aggregator 110 to send aligned data for storage and deduplication purposes, it may be necessary to read data from the production storage 108.

IOs received from the splitter 106 are collected or buffered in a memory of the RPA 120 or in a temporary storage that can handle the load (e.g., VM VMDK, block storage, VSAN etc). Once enough IOs accumulate in the memory or the temporary storage used by the aggregator 110, the accumulated IOs are sent (e.g., in batches) to the secondary storage as a journal or a journal stream. This isolates the secondary storage 112 from high IOPs/small IO patterns and optimizes transmission to the secondary storage 112. The aggregated IO also complies or is processed to comply with the format associated with the journal 116. The aggregator 110 may align the IOs in a way that is best for consumption by the secondary storage 112.

For example, the aggregator 110 may store the incoming IO stream such that the IO data is aligned to deduplication boundaries. This helps ensure optimal deduplication once the accumulated IOs are pushed to the secondary storage 112. Aligning the IO stream, as discussed below, may include separating the IO stream into a data stream and a metadata stream.

As previously stated, certain IOs may require further processing. For example and in the case of a chunk size of 4K, if a 1K IO arrives, the splitter 106 may read 3K from the production storage 108 such that the IO has a 4K size. The resulting chunk can then be sent to the aggregator 110. The data read from the production storage 108 typically corresponds to the data adjacent the 1K data. Thus, the 1K IO and the 4K chunk are associated with the same address in the production storage 108 in one example.

If the splitter 106 does not compensate for small IOs, then the aggregator 110 can compensate for small IOs by reading from the production storage 108. When the 1K IO arrives at the aggregator 110, the aggregator 110 may: not acknowledge the IO, read from the production storage 108, then acknowledge the original IO. This is typically performed when the splitter 106 splits serially.

When splitting serially, the splitter 106 or streaming source waits for the acknowledgment from the production data before sending the data to the aggregator 110. The aggregator may acknowledge separately. Complementing or compensating small IOs can introduce latency.

Thus, the alignment of the IOs or write data is performed by the splitter 106 or the aggregator 110. More specifically, the data being replicated or backed up is a prepared for storage in the secondary storage 112.

As previously stated, the journal may include a data stream and a metadata stream. Thus, the IO stream received from the splitter 106 may be processed to generate this format. In one example, the IO stream sent by the splitter 106 is output by the aggregator 110 to include two streams in one example: a data stream and a metadata stream.

Figure 2:
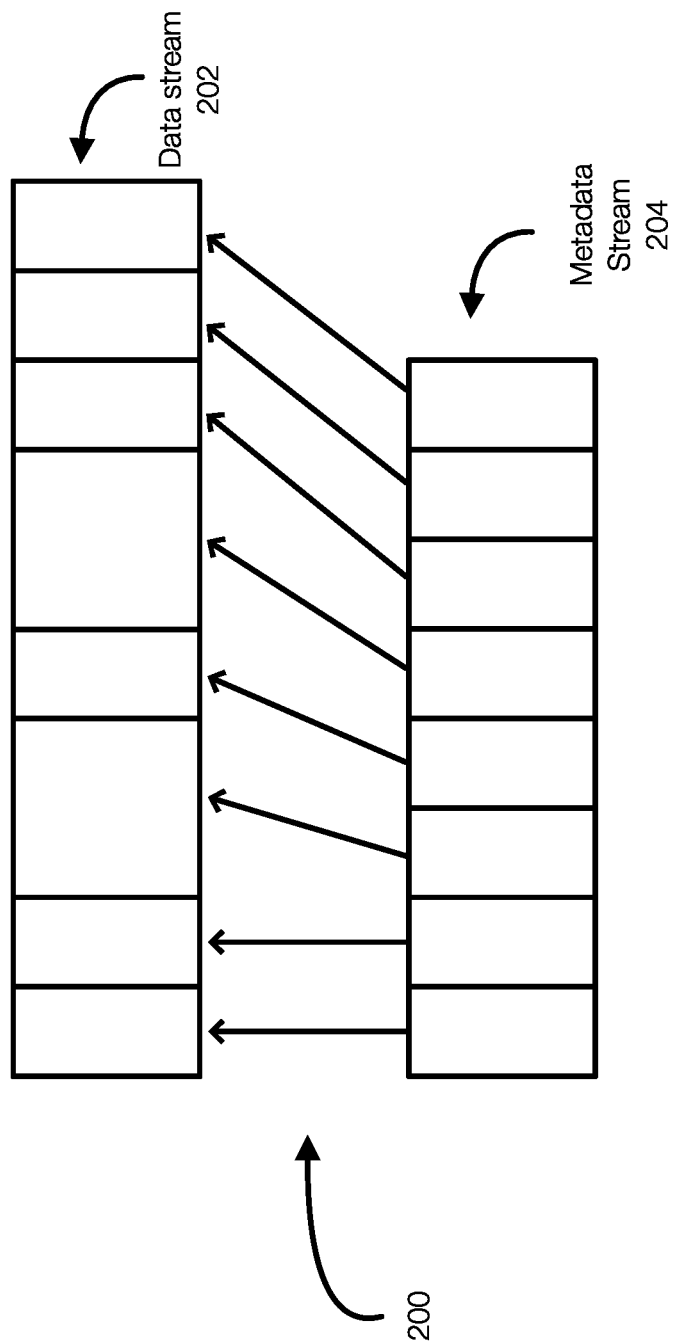
FIG. 2 illustrates an example of a journal used in generating point in time backups.

FIG. 2 illustrates an example of a data stream and a metadata stream that constitute an example journal. FIG. 2 illustrates that the journal 200 includes a data stream 202 and a metadata stream 204. In this example, both the data stream 202 and the metadata stream 204 are organized as incrementing in time lists of items. The data stream 202 contains the IOs. The IOs in the data stream 202 are aligned to deduplication boundaries. If the chunk size is 4K, each entry in the data stream 202 includes data whose size is a multiple of 4K. The metadata stream 204 stores IO metadata, which may include but is not limited to, IO volume, location, length, timestamps, tags, user provided data, and/or descriptive data. As illustrated in FIG. 2 each entry in the metadata stream 204 has a corresponding entry in the data stream 202.

Separating the journal 200 into a data stream 202 and a metadata stream 204 ensures that the IO alignment is not affected or impacted by the metadata.

In one example, the journal 200 can be stored in one or more files. In one example, the journal 202 can be divided into sections based on time intervals. The time intervals may or may not be uniform. However, the data stream 202 and the metadata stream 204 may divided at the same intervals. Each journal section (referred to as a journal file) includes a portion of the data stream 202 and a corresponding portion of the metadata stream 204.

Embodiments of the invention, as previously stated, generate backups without native snapshots. Rather, the images or backups can be generated or synthesized from the journal. More specifically, given a full backup at time T and a journal file that starts at time T and ends at time T+t, a backup can be synthesized for any point of time in the interval T+t. Because the data is deduplicated as previously discussed, the copy operations to create the new backup can be fast copy operations and are, as a result, efficient.

For example, to construct a backup at time T1, a copy of a full backup from time T may be used. The entries in the journal starting at time T and ending at time T1 are then applied to the full backup—this is an example of rolling the journal or the journal file. This synthesizes a full backup at time T1. When copying the journal entries, the IOs from the journal may be copied to the location specified in the metadata stream.

Because the IOs in the journal may be stored in the order of arrival, rolling or applying the entries in the journal in order creates a correct representation of the data at time T1. In addition, because they are aligned in the journal, copying to the new backup will be a fast copy. Even though the copy operations are fast copy operations (which copies fingerprints or signatures rather than the actual data), these operations still require time. The time is related to the amount of the journal that is being processed or rolled. Images or backups synthesized in this manner can be created at a specified cadence, in an ad hoc manner (e.g., in response to a client request), for internal purposes, disaster recovery purposes, business recovery purposes, or the like.

In one example, the secondary storage may be optimized for sequential IOs. The journal can be processed to accommodate the configuration of the secondary storage. In one example, the writes in the journal are sorted in an order that makes the writes more sequential while preserving write order fidelity. For example, the IOs can be sorted in increasing order based on the IO location or address. If two writes overlap (fully or partially), then the later IO (in terms of time) should be placed later in the sort. If an IO is fully covered by one or more later IOs, the IO that will be overwritten can be skipped at least because it will be overwritten.

Figure 3:
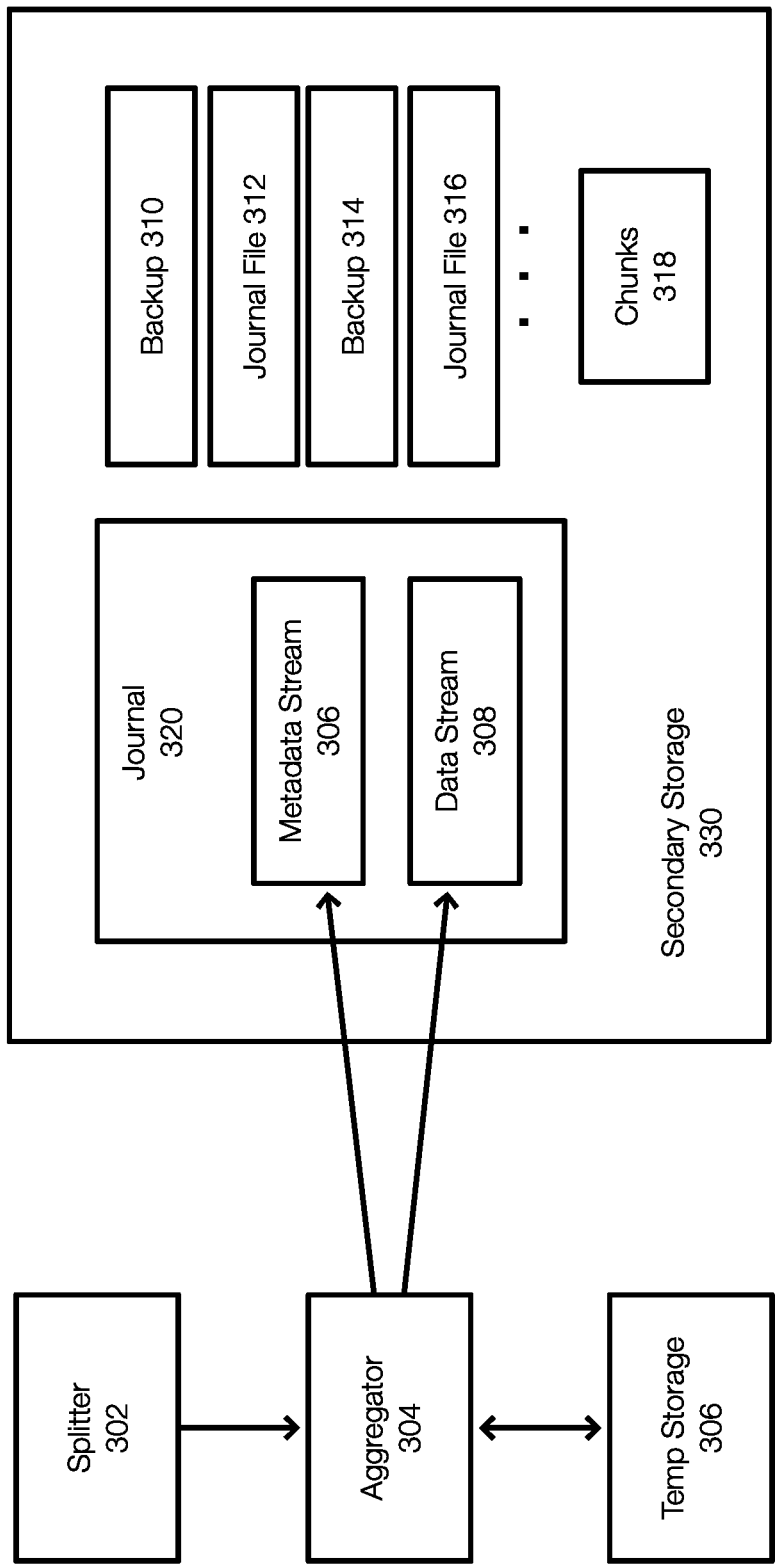
FIG. 3 illustrates an example of backups generated from a journal in a data protection system.

FIG. 3 illustrates a more detailed view of the data protection system and illustrates a manner in which backups and the journal are stored. FIG. 3 illustrates a splitter 302 that sends data to an aggregator 304. The aggregator 304 may send streams that, together, constitute a journal.

The aggregator 304 may perform some processing such as performing boundary alignment as previously described and batching the data for large IO transfers to the secondary storage 330. The aggregator 304 may use a temp storage 306 for these purposes.

The aggregator may generate a stream that is representative of a journal or that includes a journal. The journal 320 may include a metadata stream 306 and a data stream 308. The journal 320 can be used to generate or synthesize backups. FIG. 3 illustrates backups that may be synthesized at a particular cadence or at other times and for various reasons. The data or backups may include a backup 310, which may correspond to a time T0. Using the journal file 312, which corresponds to a time interval of the journal 320, the backup 314 can be generated from the backup 310 and the journal file 312. Thus, the backup 314 may correspond to a time T1. Using the backup 314 and the journal file 316, a backup corresponding to the time T2 can be generated. Thus, the journal or portions thereof can be used to synthesize backups. As previously stated, these backups may include signatures, which allows a fast copy to be performed. The actual chunks 318 may be stored in the secondary storage as well or in another storage.

In this example, the cadence at which the backups are generated can be balanced with the number of full backups and the desired RPO. A longer cadence may result in a higher RPO while a shorter cadence may lower the RPO but may also impact the secondary storage 330 capacity.

Stated differently, keeping only a single full image and the journal presents difficulties because the time needed to roll the journal to a particular point in time could be substantial. On the other hand, generating a full backup for every point in time would allow older images to be deleted. However, this approach may require substantial storage. Thus, the selection of the cadence can balance these competing concerns of the number of full backups and the journal rolling time.

The secondary storage 330 may also provide (e.g., via a controller or other manager) the ability to free space or storage. As backups age, the need for full resolution is diminished. In one example, older full backups can be kept and the corresponding journal files or journal portions can be deleted at least because these journals are reflected in the full backups. Alternatively, older backups can be selectively deleted. Instead of having one per hour, the backups can be thinned to one per day, or one per week.

Recent images may be kept at full resolution. As a result, the more recent images provide any point in time functionality. This functionality is reduced as the images age and the resolution is diminished. In one example and if all of the journal information is persisted, full images may be deleted without data loss (except the first backup). However, recovering a particular point in time may require considerable time to roll the journal.

Embodiments of the invention are able to generate full backups at a cadence. However, the decision of when to create a backup may not be determined by a cadence related to time. For example, a new backup may be generated based on the number of IOs or based on the amount of data in the journal. For example, a new backup may be generated for every 100 MB received. Alternatively, backups may be created based on processor/memory resources for rolling or based on expected rolling time. In another example, images can be created for compliance reasons or based on user requests.

If there is a limit to parallelism of updating the image during the roll (for example due to the amount of write handles that can open a file), when fast copying the full backup, it can be split into multiple slabs (for example 16 GB slabs) and each slab can be processed in parallel. After the IOs have been rolled, the slabs are concatenated together to form the full backup. This is an optimization for rolling speed.

When rolling the image, the metadata can be analyzed to look for IOs that have been written multiple times in the interval being processed. Only the last one needs to be copied over.

Figure 4:
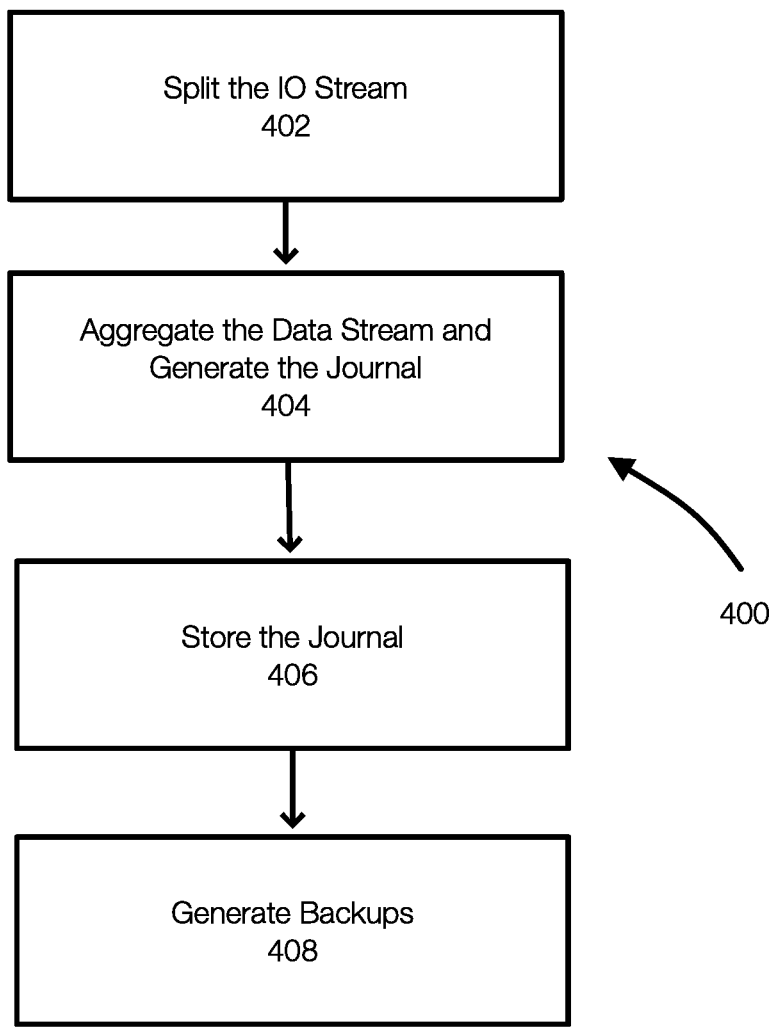
FIG. 4 illustrates an example of a method for generating any point in time backups.

FIG. 4 illustrates an example of a method for generating backups or, more generally, for performing a data protection operation. The method 400 may begin by splitting 402 a source IO stream. The IO stream may occur at a host such as a virtual machine and may be associated with one or more applications. The IO stream may be associated with a specific volume or set of volumes. For example, the IO stream may include writes by an application to a production storage and the IO stream may be received by a splitter that splits the IO stream. The splitter may send the original IO stream to the production storage and a copy of the IO stream is transmitted to a data protection system or to an aggregator. The IO stream may be transmitted in accordance with an IO pattern of the source.

The IO stream is aggregated 404 by the data protection system or by an aggregator. Aggregating 404 the IO stream may include separating (if necessary or if not already performed by the splitter) the IO stream into a data stream and a metadata stream. The aggregator may also perform alignment and other functions as previously discussed. Together, the data stream and the metadata stream constitute the journal. The journal may be transmitted to the secondary storage. The journal may be transmitted in batches, for example because the data protection system is configured to handle large data transfers. The journal is then stored 406 at the secondary storage. When storing the journal, the data stream and the metadata stream may be kept separate. In addition, the journal may be divided into journal files, where each journal file corresponds to an interval, which may be based on various factors such as time, data amount, RPO expectations, or the like or combination thereof.

Once the journal is stored (or while the journal is being stored at least because the journal is received as a stream and does not necessarily stop), backups may be generated 408 from the journal. For example, full backups may be generated at times by rolling the journal relative to an existing backup.

In one example, the data protection system is initiated with a full backup prior to a start of the journal. Then, by rolling the journal relative to the backup, which includes applying entries or IOs in the journal to the starting point, a new backup can be generated. This process can continue such that the backups can be generated based on previous backups and the journal. Over time, portions of the journal and/or existing backups/images can be deleted.

Embodiments of the invention further allow for generating PiT backups for consistency groups. A consistency group, by way of example and not limitation, is a group of services, applications, disks, etc., that should be recovered together. In another example, portions of a disk may constitute a consistency group, for example when the disk is associated with multiple aggregators.

In some embodiments, in order to improve throughput and efficiency of the data protection system, the splitter or splitters may send data to different aggregators. Embodiments of the invention in part relate to ensuring that consistent PiT backups can be generated for consistency groups.

To ensure that consistent PiT backups can be generated, the data protection system may implement a bookmark protocol. The bookmark is typically inserted into the IO stream from the splitter to an aggregator. When a bookmark is detected, all aggregators are notified of the bookmark and all IOs prior to the bookmark are flushed to the secondary storage by the various aggregators. In other words, the journals for multiple splitters and/or multiple aggregators are flushed and stored individually in one example. These journals can then be processed, based on the bookmark, to create a do stream. In effect, the do stream represents the journal (or a part of a journal) of the consistency group after the individual journals have been merged by one of the aggregators. The do stream is a combination of the individual journals received from the various aggregators.

Advantageously, the bookmark protocol ensures that any PiT backups can be generated from the perspective of a consistency group and in the context of multiple aggregators.

Embodiments of the invention thus relate to using multiple aggregators to distribute a production workload to secondary storage. This further improves the protection of high-production workloads and allows for any PiT backups. For example, multiple aggregators improve performance when a single aggregator does not have sufficient bandwidth to handle the production load.

Embodiments of the invention further relate to data protection operations in the context of multiple aggregators. This includes the ability to determine a consistent point in time for a consistency group, the ability to synchronize the consistency group with respect to writes or with respect to a bookmark, or the like.

Figure 5:
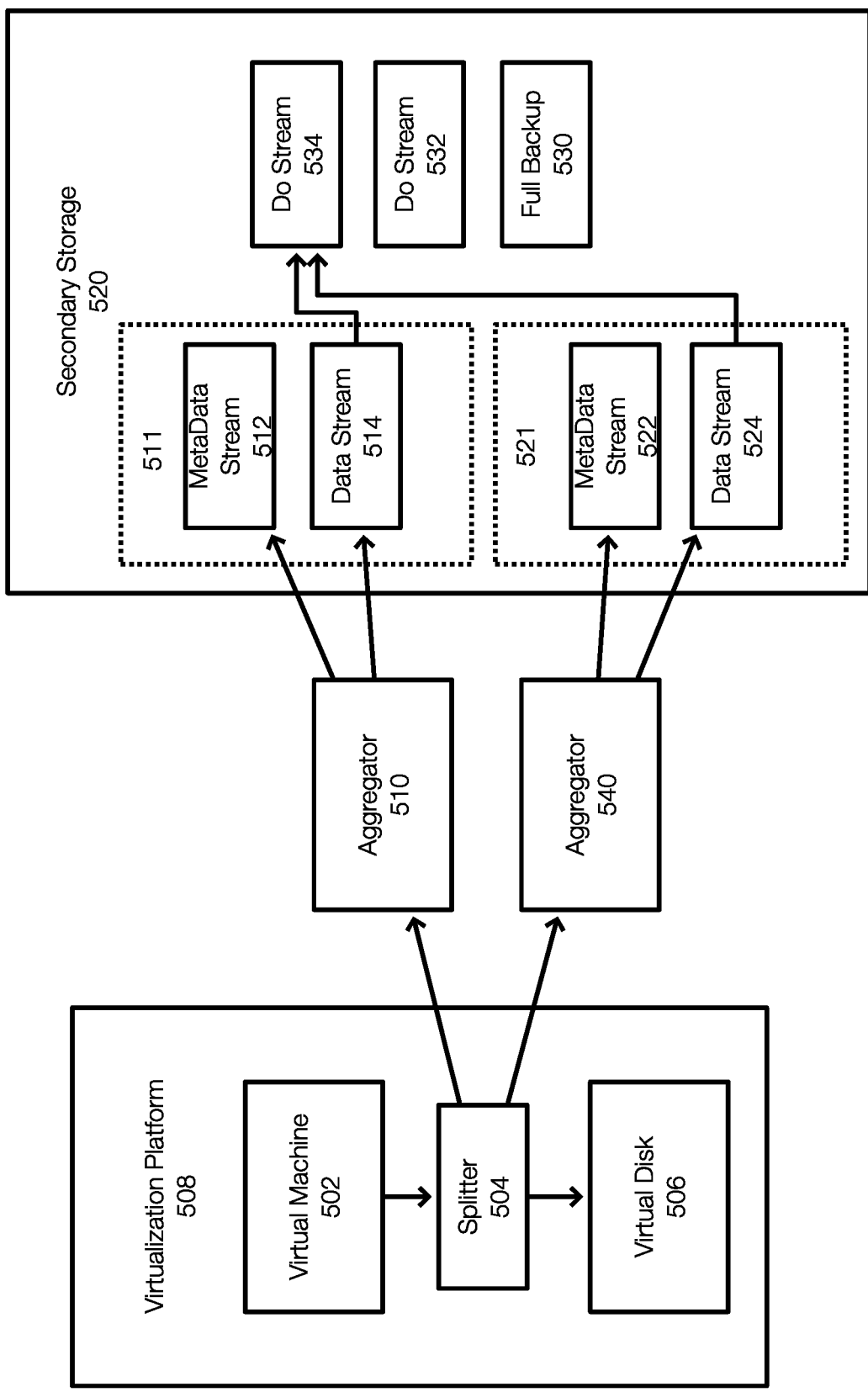
FIG. 5 illustrates an example of a data protection system configured to perform data protection applications and generate point in time backups using multiple aggregators.

FIG. 5 illustrates an example of a system that provides any PiT backups using multiple aggregators. FIG. 5 illustrates a virtual machine 502 that is associated with a virtual disk 506 or with virtual disks. The virtual machine 502, the virtual disk 506 and a splitter 504 may be associated with or run on a virtualization platform 508.

The splitter 504 may intercept writes or IOs from the virtual machine 502 to the virtual disk 506 and send the writes to multiple aggregators 510 and 540 (e.g., replication appliances). The aggregators 510 and 540 may also be associated with or run on a virtualization platform.

The splitter 504 is configured to copy IOs or writes to the aggregators 510 and 540. The manner in which the writes are distributed to the aggregators 510 and 540 can vary. The distribution may be performed in a round robin manner, based on address, volume, in an alternating manner that is independent of data address, or the like.

Because the writes from the virtual machine 502 are distributed to multiple aggregators 510 and 540, the aggregators (and the data protection system as a whole) are more efficient. Each of the aggregators 510 and 540 may temporarily store the IO stream from the splitter and can transfer data to the secondary storage 520 in larger batches. As previously stated, the aggregators 510 and 540 each send a journal stream that includes a metadata stream and a data stream to the secondary storage 520. The aggregator 510 outputs a journal stream 511 that includes the metadata stream 512 and the accompanying data stream 514. The aggregator 540 outputs a journal stream 521 that includes the metadata stream 522 and the corresponding data stream 524.

The journal stream 511 and the journal stream 521 may not be synchronized when initially stored in the secondary storage 520. In order to achieve consistency at the level of a distributed consistency group, embodiments of the invention relate to synchronizing the journal stream 511 and the journal stream 521 (and/or other journal streams that may be associated with the consistency group).

In one example, the synchronization occurs or is initiated using a bookmark protocol. More specifically, the bookmark protocol can be initiated by inserting a bookmark into the IO stream sent by the splitter 504.

The journal streams 511 and 521 are generally ordered, but they may not be completely ordered. Also, the entries in the journal streams 511 and 521 are typically numbered. As used herein, the numbering of the entries in the journal streams includes a variety of different implementations. The numbering refers to order in one example. The numbering can be achieved in different ways or derived in different ways. For example, the splitter 504 may add a number to each IO as metadata. Thus, each IO is associated with a different number and this allows the IOs to be ordered. Timestamps may also be used to determine the order of the IOs in the production system associated with the virtual machine 502. Thus, the numbering may refer to a timestamp or a point in time. The numbering can be achieved based on existing metadata or by adding metadata to the metadata stream.

Further, there is often locality in ordering the IOs. More specifically, even if the IOs are out of order in the journals, they are often in the same proximity. As a result, reordering is efficient. IOs that are out of order are likely close to their correct position or location in the journals. For example, IOs may be localized at bookmark barriers, but are usually much closer.

The bookmark protocol initiates the synchronization of the journal streams 511 and 521. In one example, one of the aggregators is responsible for creating a consistent backup on the secondary storage 520. In this example, the aggregator 510 is responsible for creating a consistent backup on the secondary storage 520 or for making it possible to recover to any PiT. In other words, the aggregator 510 is responsible for initiating the bookmark protocol and ensuring that the bookmark protocol is completed.

Figure 6:
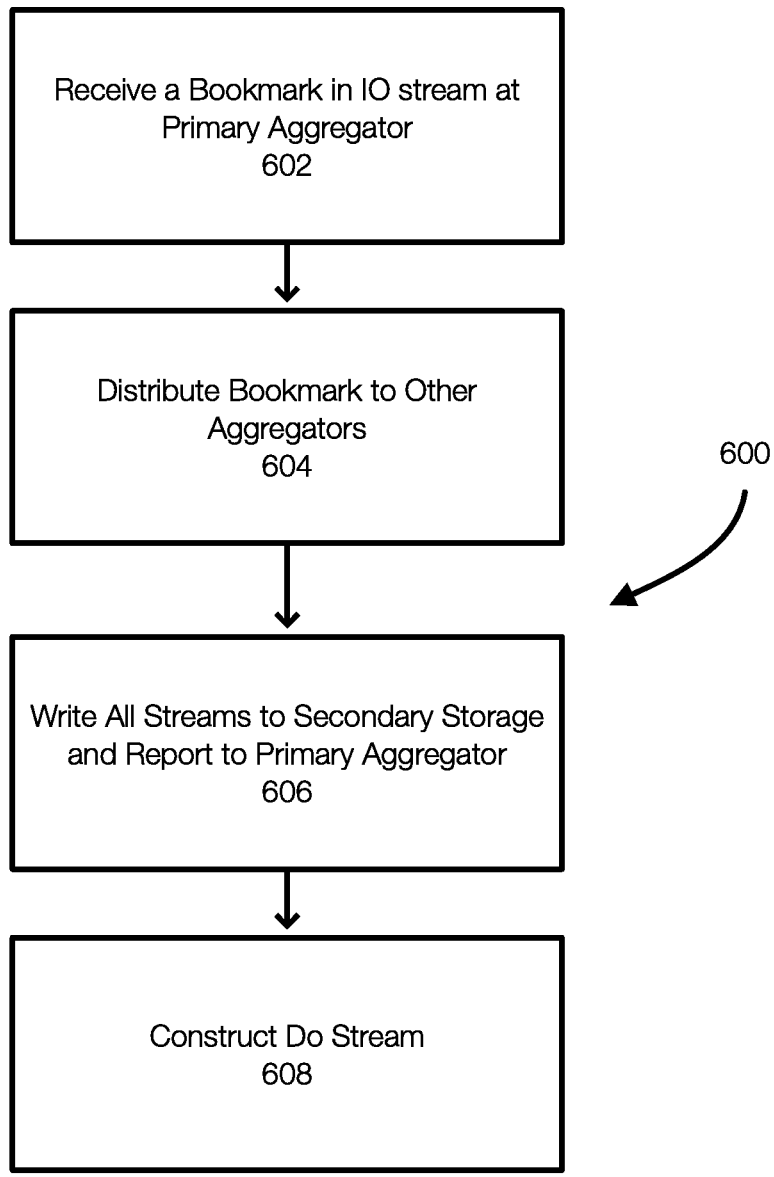
FIG. 6 is an example of a bookmark protocol for generating point in time backups and performing other data protection operations.

FIG. 6 illustrates an example of a bookmark protocol. FIG. 6 is described with reference to FIG. 5. In FIG. 6, the primary aggregator (e.g., aggregator 510 in FIG. 5) may receive a bookmark in the IO stream received from the splitter 504. When the bookmark is received, the aggregator 510 initiates the bookmark protocol. Initially, the bookmark is distributed 604 to the other aggregators. Thus, the bookmark is distributed to the aggregator 540 in this example. Further, the bookmark may be distributed to all aggregators associated with a consistency group.

The bookmark may be configured to represent a point in time, a specific IO, or the like. For example, the bookmark may identify or reference an IO number, a point in time, or the like as previously stated. If the bookmark references IO 100, then the consistent backup and the backup protocol is being performed with reference to IO 100. The bookmark may reference a timestamp or otherwise identify a time or location in the IOs generated in the production system that have been split to the aggregators.

After the bookmark has been distributed by the aggregator 510, the aggregators 510 and 540 write 606 all streams to the secondary storage and open new streams for new incoming data from the splitter. The memories of the aggregators 510 and 540 are flushed to the secondary storage and stored as journals. More specifically, the journals that were closed in response to the bookmarks are flushed to the secondary storage.

After the relevant journals have been transmitted to the secondary storage, the aggregators that received the bookmark from the primary aggregator report 606 to the primary aggregator that the memories have been flushed. This ensures that all IOs that occurred prior to the bookmark (the bookmark for IO 100 in this example) are stored in the journals (e.g., the journals 511 and 521). Once all of the aggregators have reported that all data has been flushed to the secondary storage, the primary aggregator may construct 608 a Do Stream such as the Do stream 534.

The Do Stream 534 is constructed from the journals 511 and 521 (and/or portions thereof) written to the secondary storage in response to the bookmark protocol. In some examples, some of the relevant IOs may have already been written to the secondary storage before the bookmark was received. The metadata streams 512 and 522 can be examined to determine the IO numbers (numbers up to 100 are processed in this example) in the journals 511 and 521 and/or in journals already present at the secondary storage. This allows the aggregator 510 to construct the Do Stream 534. In one example, the Do Stream 534 may include pointers to the data in the data streams 514 and 524. As a result, the Do stream 534 can be constructed by manipulating data pointers. This makes the process fast and does not excessively consume resources.

Figure 7:
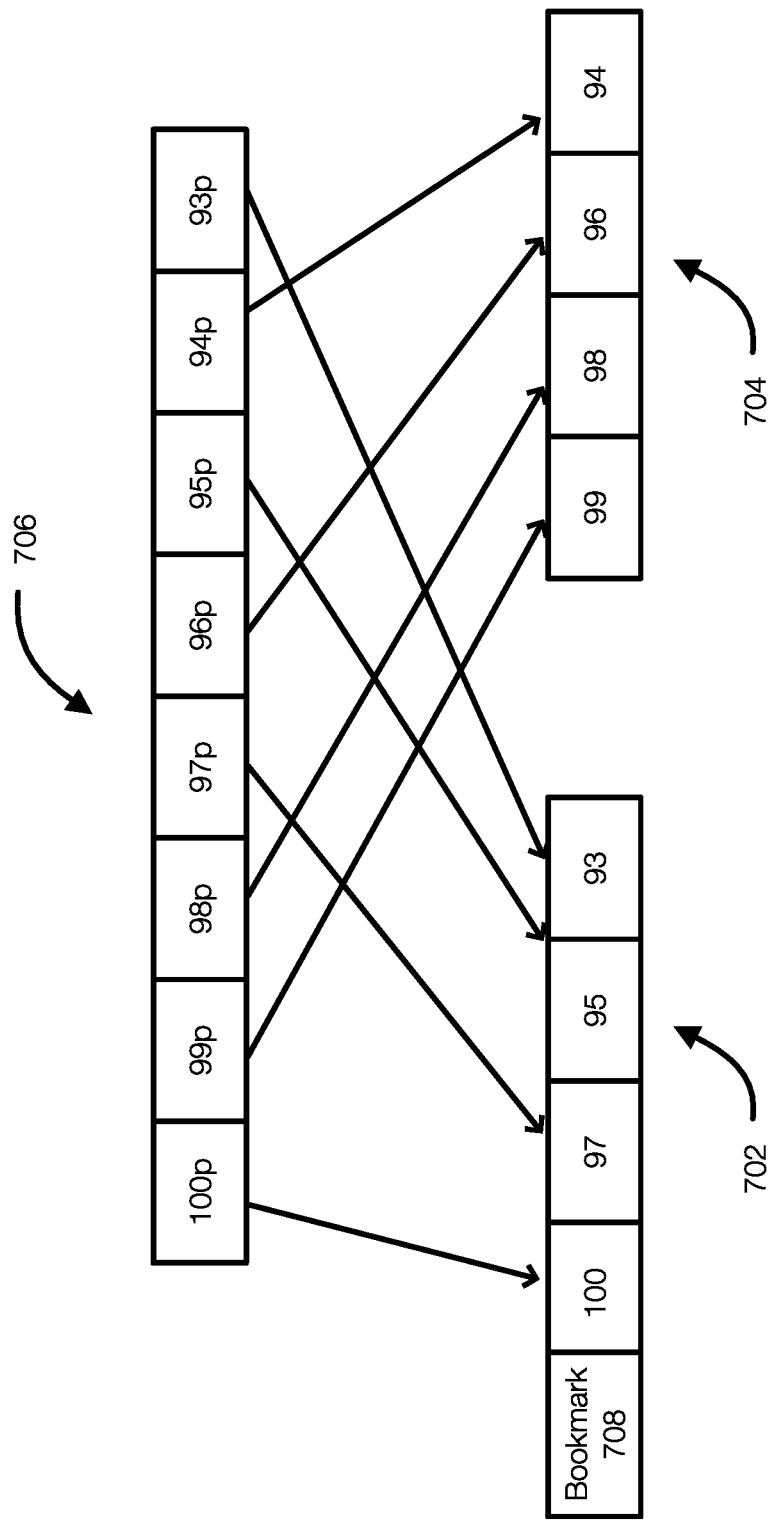
FIG. 7 is an example of constructing a do stream from multiple journal streams.

FIG. 7 illustrates an example of constructing a Do Stream from individual journals or journal streams. In one example, the Do Stream 706 is constructed by the primary aggregator. FIG. 7 illustrates a journal 702 (e.g., associated with the aggregator 510) and a journal 704 (e.g., associated with the aggregator 540). At least part of the journals 702 and 704 were written to the secondary storage in response to a bookmark received by the primary aggregator. The journals 702 and 704 also include IOs up to an IO specified in or derived from the bookmark.

In general, the bookmark is used to establish a consistent PiT at which the journals or Do Stream and backups stored in the secondary storage are consistent. For example, a bookmark may be used to generate a full backup that is consistent in the secondary storage. The bookmark may be inserted into the IO stream from the splitter in response to a user request, prior to an update at the production state, in anticipation of a workload surge, based on a predetermined schedule, or the like.

In one example, the bookmark may or may not specify or identify a particular 10. The placement of the bookmark in the IO stream can inherently identify the IO (e.g., the IO or IOs that preceded the bookmark). The bookmark, however, allows IOs prior to the bookmark to be identified and allows IOs subsequent to the bookmark to be identified. This may allow, for example, an aggregator to only flush data that is prior to the bookmark to the secondary storage. IOs that occur after the bookmark may be stored in a new journal at the aggregators and/or at the secondary storage when transmitted to the secondary storage. The bookmark starts the process of generating the Do Stream from the journals of all of the aggregators associated with the virtual disk or with the consistency group.

The journals 702 and 704 may include the metadata stream and/or the data stream. In this example, the IOs in the journals 702 and 704 are numbered from 93-100 and are representative of the IOs in the journal. FIG. 7 also illustrates that the bookmark 708 was received by the primary aggregator and shared with the other aggregators.

Once the aggregators have flushed their data with respect to the bookmark to secondary storage, the Do Stream 706 is constructed from the journals 702 and 704. The do stream 706 may be implemented as an ordered list that points to the data in the data streams in the journals 702 and 704. Thus, pointers 93$p$, 94$p$, 95$p$, 96$p$, 87$p$, 98$p$, 99$p$, and 100$p$ in the Do Stream 706 point to the corresponding data in the journals 702 and 704. In particular, pointers 99$p$, 98$p$, 96$p$, and 94$p$ point to the data in the journal 704 and the pointers 100$p$, 97$p$, 95$p$ and 93$p$ point to the data in the journal 702. The Do Stream 706 thus contains the IOs relevant to the consistency group at a consistent point in time. If desired, a full backup may be generated by rolling the journal to the bookmark point or to the IO 100 in this example.

As illustrated, this process may include pointer manipulation rather than moving data from one location to another location. The Do Stream 706 contains pointers, but may also include entries similar to the entries in the journals 702 and 704.

Returning to FIG. 5, the do stream 534 represents the result of the processing performed by the primary aggregator (e.g., the aggregator 510). In one example, the Do Stream 534 and the Do Stream 532 are part of the same Do Stream, but may be different files (e.g., file size may be limited). The Do Streams 532 and 534 could be concatenated and form a single continuous Do Stream.

The secondary storage 520 may also include a full backup 530 (or multiple full backups). This allows any point in time to be recovered by applying IOs in the Do Stream to the full backup. Be generating full backups at different points in time, this controls the number of IOs from the Do Stream that may need to be applied to the full backup to generate the point in time backup from which a particular point in time may be restored.

In some instances, an IO may be missing. This may trigger a read to the source data to retrieve the IO or to determine if the IO is still in the memory of the aggregators. If the IO cannot be found, a synchronization or at least a partial synchronization may be performed.

Embodiments of the invention further relates to full synchronization (or to the synchronization of a particular area or address range of a data source). In one example, a full synchronization can be performed while replicating new IOs to the production storage.

Figure 8:
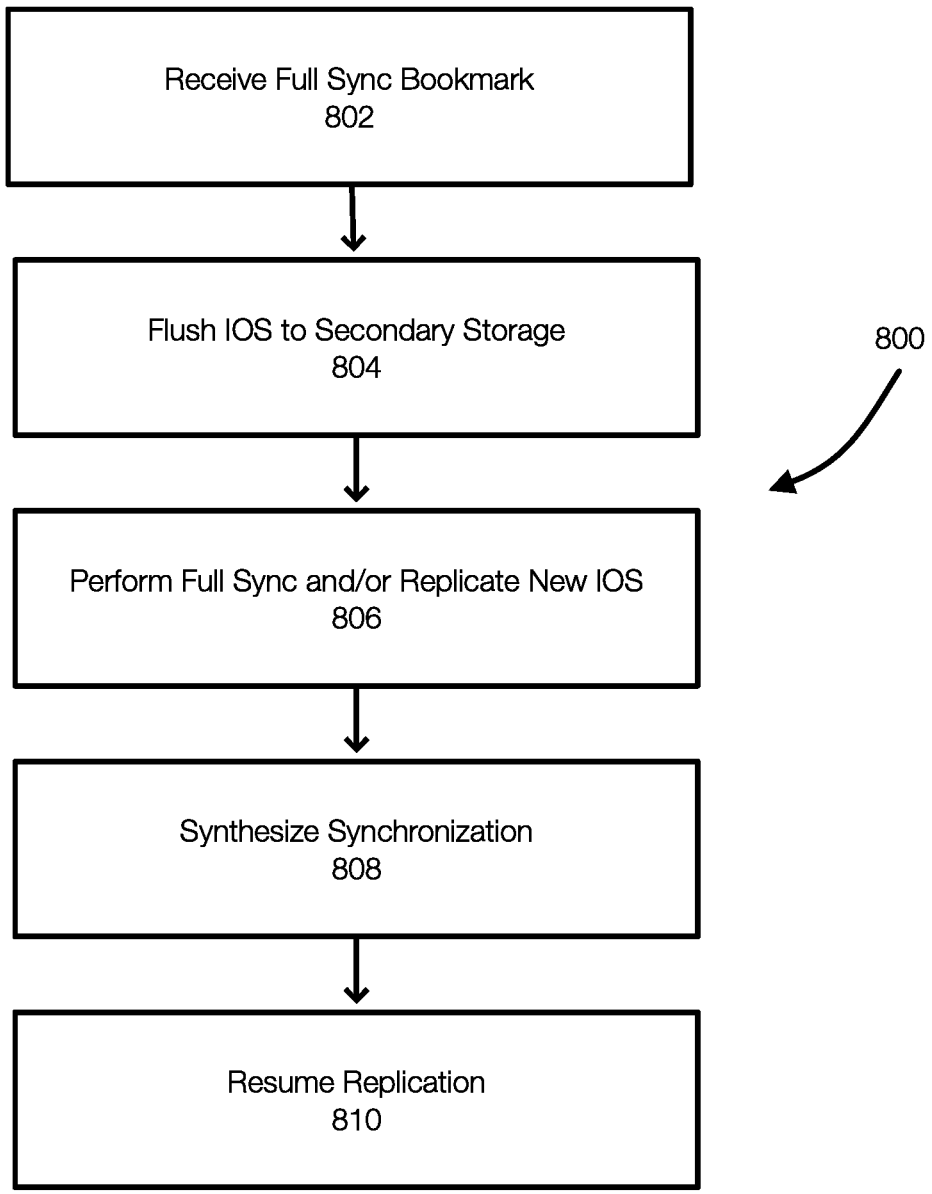
FIG. 8 illustrates an example of a method for performing a synchronization operation.

FIG. 8 illustrates an example of performing a full synchronization and/or replication for new IOs. In one example, a full synchronization and the replication of new IOs can be performed simultaneously. In order to perform a full synchronization efficiently, the replication mode may be changed at least for the full synchronization. New IOs may be handled normally. For example, each aggregator may be responsible for a sequential portion of the source data during a full synchronization. As previously stated, an aggregator can efficiently transfer larger data sizes. Further, this allows the data to be read sequentially.

Changing the mode to sequential allows each aggregator to open larger files for synchronization. This allows for faster completion of the synchronization process. In addition, this results in fewer files on the secondary storage. Plus, the synthesis process performed at the secondary storage to create the full backup is faster.

The method 800 illustrates that a full sync bookmark is received 802. The primary aggregator typical receives the full sync bookmark, which is distinct from the bookmarks previously discussed as the full synch bookmark results in a full synchronization (or the synchronization of a larger area or portion of the source data).

After the full sync bookmark is received and all aggregators have been advised or notified of the full sync bookmark, all aggregators flush 804 their IOs or journals to the secondary storage. Synchronization is then performed 806 while also replicating new IOs.

In one example, the aggregators perform the synchronization by reading the source (e.g., the virtual disk). More specifically, the reads are sequential and each aggregator reads a sequential portion of the virtual disk. With reference to FIG. 5, each of the aggregators 510 and 540 may read half of the virtual disk 506. At the same time, new IOs may be handled as previously described.

During synchronization, the aggregators may encounter different circumstances. First, the aggregators may read data (old IOs) that have not been overwritten with a new IO during synchronization. Second, old data may be read by the aggregators and the old data may be subsequently overwritten with new data. However, the new data is replicated by the aggregators while the data being synchronized and read from the virtual disk may be in a different file. Further, synthesizing the backup for the full synchronization will account for any problems. Third, old data may be overwritten by new data before the aggregators read that location. In this example, the new data is simply read. In addition, the new data is also replicated into the journals. In other words, the full synchronization can be performed without regard to these possibilities because the synthesis of the journals associated with the synchronization and the journals associated with replication resolve these issues.

Once the virtual disk has been read, the primary aggregator may perform processing to synthesize 808 the data read by the synchronization process with the journals associated with the replication (i.e., the IOs replicated by the splitter). In one example, the synchronization process may result in a journal or a journal like stream for the virtual disk or for the consistency group. Once the journals are synthesized, replication may resume 810 as normal. Normal replication may be started using an end full sync bookmark.

Figure 9:
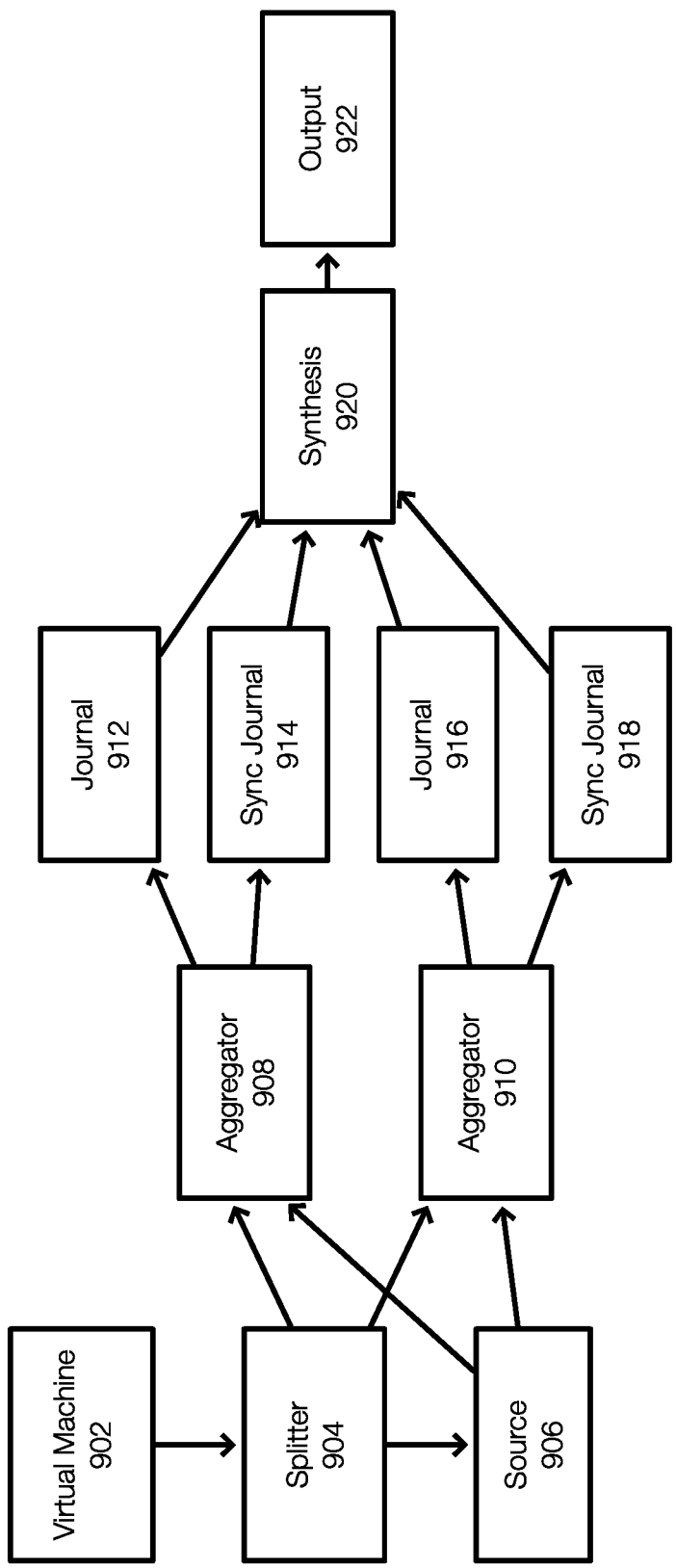
FIG. 9 illustrates an example of performing a synchronization operation while simultaneously replicating a production system to a data protection system.

FIG. 9 illustrates a process of performing a full synchronization. As previously stated, the full synchronization may be for a large portion of the source data or of the consistency group. For example, the size of a virtual disk may be increased. The added area may be synchronized. In another example, a portion of the data may be corrupt and the portion of the disk corresponding to the corrupt data is synchronized.

FIG. 9 illustrates a production system or site that includes a virtual machine 902 that may send writes to a source 906 (an example of production storage). The writes or IOs between the virtual machine 902 and the source 906 are intercepted by a splitter 904. The data protection system may include multiple aggregators represented by aggregators 908 and 910. The aggregator 908 is the primary aggregator in this example.

When performing a full synchronization or a synchronization of a large portion of the source 906, the process may be initiated when the primary aggregator 908 receives a full sync bookmark. The full sync bookmark may be sent by the data protection system, a user, or the like. The data protection system may send a full synch bookmark when, for example, corruption is detected in the backups or there is a need for a full backup or for another reason. The aggregator 910 is notified of the full sync bookmark.

As shown in FIG. 9, the splitter 904 continues to replicate new IOs to the aggregators 908 and 910. This may be performed using the current replication distribution or based on the approach taken by the synchronization process. To synchronize, the aggregators 908 and 910 each read a portion of the source 906. In one example, the splitter is not involved in this part of the full synchronization process where the source 906 is read by the aggregators 908 and 910.

The IOs received from the splitter 904 are stored in the journal 912 and the journal 916 by, respectively, the aggregator 908 and the aggregator 910. The reads performed by the aggregators 908 and 910 on the source 906 are stored in the sync journals 914 and 918. These journals may be transferred from the temporary storage of the aggregator to secondary storage.

Once the source 906 has been read, the aggregator 908 performs a synthesis 920 to combine the journals 912, 914, 916, and 918 to generate an output 922. The output 922 may be a full backup, a Do stream, or other representation that allows for PiT backup and PIT recovery operations. Once the synthesis 920 is completed, the source 906 and the output 922 or the backups are synchronized and normal replication may continue as described herein.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, PiT backup generation operations. Such operations may include, but are not limited to, data read/write/delete operations, data deduplication operations, data backup operations, data restore operations, data cloning operations, data archiving operations, PiT operations, synthesis operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method comprising receiving a first IO stream at a primary aggregator from a splitter, wherein the splitter intercepts writes directed to a source, receiving a bookmark in the first IO stream, distributing the bookmark to a second aggregator, wherein the second aggregator receives a second IO stream from the splitter, writing a first journal of the primary aggregator to secondary storage and writing a second journal of the second aggregator to the secondary storage, and constructing a do stream from the first journal and the second journal, wherein the do stream allows an any point in time backup to be generated.

Embodiment 2. The method of embodiment 1, wherein constructing the do stream includes manipulating pointers such that entries in the do stream point to data in the first journal and to data in the second journal.

Embodiment 3. The method of embodiment 1 and/or 2, wherein the do stream includes an ordered list of IOs from the source.

Embodiment 4. The method of embodiment 1, 2 and/or 3, wherein the source is one of a virtual disk or a consistency group.

Embodiment 5. The method of embodiment 1, 2, 3, and/or 4, further comprising the primary aggregator notifying the second aggregator of the bookmark.

Embodiment 6. The method of embodiment 1, 2, 3, 4, and/or 5, wherein the bookmark identifies a point in time for the IO stream generated by the splitter.

Embodiment 7. The method of embodiment 1, 2, 3, 4, 5, and/or 6, wherein the primary aggregator and the second aggregator transmit, respectively, the first journal and the second journal to the secondary storage, wherein the primary aggregator and the second aggregator each start a new journal for writes received in the first and second IO streams occurring after the bookmark.

Embodiment 8. The method of embodiment 1, 2, 3, 4, 5, 6, and/or 7, further comprising performing a full synchronization on the source, wherein the primary aggregator and the second aggregator are associated with different sequential portions of the source with regard to the full synchronization, wherein the primary aggregator and the second aggregator read from the source to generate corresponding sync journals for the full synchronization while receiving the first and second IO streams from the splitter.

Embodiment 9. The method of embodiment 1, 2, 3, 4, 5, 6, 7, and/or 8, further comprising initiating the full synchronization by sending a full sync bookmark to the primary aggregator.

Embodiment 10. The method of embodiment 1, 2, 3, 4, 5, 6, 7, 8, and/or 9, further comprising synthesizing the sync journals and the first and second journals into the do stream.

Embodiment 11. A method for performing any of the operations, methods, or processes, or any portion of any of these, of embodiments 1-10 and/or disclosed herein.

Embodiment 12. A non-transitory storage medium having stored therein instructions that are executable by one or more hardware processors to perform the operations of any one or more of or portions of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components.

In one example, physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   in a distributed consistency group:
      receiving a first IO stream at a primary aggregator from a splitter, wherein the splitter intercepts writes directed to a source;
      receiving a second IO stream at a second aggregator from the splitter, wherein the splitter is configured to distribute the writes to the primary aggregator and the second aggregator;
      receiving at the primary aggregator a bookmark in the first IO stream;
      distributing the bookmark to the second aggregator;
      writing a first journal of the primary aggregator to secondary storage and writing a second journal of the second aggregator to the secondary storage, wherein the first journal includes the first IO stream before the bookmark and the second journal includes the second IO stream before the bookmark; and
      constructing a do stream by combining the first journal and the second journal and manipulating pointers such that entries in the do stream point to data in the first journal and to data in the second journal, wherein the do stream allows an any point in time backup to be generated for the consistency group.

2. The method of claim 1, wherein the do stream includes an ordered list of IOs from the source.

3. The method of claim 2, wherein the source is one of a virtual disk or a consistency group and wherein the writes are distributed in a round robin manner, based on address, based on volume, or in an alternating manner that is independent of address and wherein the splitter comprises multiple splitters.

4. The method of claim 1, further comprising the primary aggregator notifying the second aggregator of the bookmark.

5. The method of claim 1, wherein the bookmark identifies a point in time for the IO stream generated by the splitter.

6. The method of claim 1, wherein the primary aggregator and the second aggregator transmit, respectively, the first journal and the second journal to the secondary storage, wherein the primary aggregator and the second aggregator each start a new journal for writes received in the first and second IO streams occurring after the bookmark.

7. The method of claim 1, further comprising performing a full synchronization on the source, wherein the primary aggregator and the second aggregator are associated with different sequential portions of the source with regard to the full synchronization, wherein the primary aggregator and the second aggregator read from the source to generate corresponding sync journals for the full synchronization while receiving the first and second IO streams from the splitter.

8. The method of claim 7, further comprising initiating the full synchronization by sending a full sync bookmark to the primary aggregator.

9. The method of claim 7, further comprising synthesizing the sync journals and the first and second journals into the do stream.

10. The method of claim 2, wherein the source is one of a virtual disk or a consistency group and wherein the writes are distributed in a round robin manner, based on address, based on volume, or in an alternating manner that is independent of address and wherein the splitter comprises multiple splitters.

11. A non-transitory storage medium having stored therein instructions that are executable by one or more hardware processors to perform operations comprising:
in a distributed consistency group:
receiving a first IO stream at a primary aggregator from a splitter, wherein the splitter intercepts writes directed to a source;
receiving a second IO stream at a second aggregator from the splitter, wherein the splitter is configured to distribute the writes to the primary aggregator and the second aggregator;
receiving at the primary aggregator a bookmark in the first IO stream;
distributing the bookmark to the second aggregator;
writing a first journal of the primary aggregator to secondary storage and writing a second journal of the second aggregator to the secondary storage, wherein the first journal includes the first IO stream before the bookmark and the second journal includes the second IO stream before the bookmark; and
constructing a do stream by combining the first journal and the second journal and manipulating pointers such that entries in the do stream point to data in the first journal and to data in the second journal, wherein the do stream allows an any point in time backup to be generated for the consistency group.

12. The non-transitory storage medium of claim 11, wherein the do stream includes an ordered list of IOs from the source.

13. The non-transitory storage medium of claim 11, the operations further comprising the primary aggregator notifying the second aggregator of the bookmark.

14. The non-transitory storage medium of claim 11, wherein the bookmark identifies a point in time for the IO stream generated by the splitter.

15. The non-transitory storage medium of claim 11, wherein the primary aggregator and the second aggregator transmit, respectively, the first journal and the second journal to the secondary storage, wherein the primary aggregator and the second aggregator each start a new journal for writes received in the first and second IO streams occurring after the bookmark.

16. The non-transitory storage medium of claim 11, the operations further comprising performing a full synchronization on the source, wherein the primary aggregator and the second aggregator are associated with a sequential portion of the source with regard to the full synchronization, wherein the primary aggregator and the second aggregator read from the source to generate corresponding sync journals for the full synchronization while receiving the first and second IO streams from the splitter.

17. The non-transitory storage medium of claim 16, the operations further comprising initiating the full synchronization by sending a full sync bookmark to the primary aggregator.

18. The non-transitory storage medium of claim 16, the operations further comprising synthesizing the corresponding journals and the first and second journals into the do stream.

* * * * *